United States Patent
Lee et al.

(10) Patent No.: US 9,517,567 B2
(45) Date of Patent: Dec. 13, 2016

(54) GRASPING APPARATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Te-Hua Lee, New Taipei (TW); Xiao-Hong Shi, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/699,800

(22) Filed: Apr. 29, 2015

(65) Prior Publication Data

US 2016/0297080 A1 Oct. 13, 2016

(30) Foreign Application Priority Data

Apr. 8, 2015 (CN) .......................... 2015 1 0162586

(51) Int. Cl.
 *B25J 15/08* (2006.01)
 *B25J 19/02* (2006.01)
 *B25J 9/16* (2006.01)

(52) U.S. Cl.
 CPC ............... *B25J 15/08* (2013.01); *B25J 9/1633* (2013.01); *B25J 19/02* (2013.01)

(58) Field of Classification Search
 CPC ....... B25J 9/1633; B25J 9/1653; B25J 9/1694; B25J 13/081–13/085; B25J 15/08; B25J 19/02

USPC ...... 294/213, 907; 901/34, 46; 700/260, 261
See application file for complete search history.

(56) References Cited

U.S. PATENT DOCUMENTS

| | | | | |
|---|---|---|---|---|
| 3,675,962 A * | 7/1972 | Simpson | ............... | B25J 15/0023 294/103.1 |
| 4,132,318 A * | 1/1979 | Wang | ................... | B25J 13/082 294/86.4 |
| 4,696,501 A * | 9/1987 | Webb | .................... | B25J 13/082 294/103.1 |
| 5,200,679 A * | 4/1993 | Graham | ............... | B25J 15/0009 294/111 |
| 5,222,778 A * | 6/1993 | Moench | ................. | B65G 47/90 294/86.4 |
| 7,984,658 B2 * | 7/2011 | Kishida | .................. | B25J 13/081 73/862.391 |
| 8,191,947 B2 * | 6/2012 | Jouan De Kervanoael | ............... | B25J 13/082 294/106 |
| 2008/0114491 A1 * | 5/2008 | Takahashi | .............. | B25J 13/082 700/245 |
| 2012/0198945 A1 * | 8/2012 | Yoneyama | ............. | B25J 13/083 73/862.042 |

(Continued)

*Primary Examiner* — Dean Kramer
(74) *Attorney, Agent, or Firm* — Zhigang Ma

(57) ABSTRACT

A grasping apparatus for grasping an object includes at least two grasping portions and at least two pressure sensing mechanisms disposed in the corresponding grasping portions. The pressure sensing mechanism detects a grasping force between the grasping portions while grasping the object. The pressure sensing mechanism includes two parallel metal films and an elastic portion therebetween. The elastic portion deforms to decrease the distance between the metal films for sensing the grasping force.

13 Claims, 5 Drawing Sheets

(56) References Cited

U.S. PATENT DOCUMENTS

2014/0156066 A1\* 6/2014 Sakano .................. B25J 13/082
700/245
2014/0238174 A1\* 8/2014 Ikebe ..................... B25J 9/1694
74/490.01

\* cited by examiner

GRASPING APPARATUS

This application claims priority to Chinese Patent Application No. 201510162586.6 filed on Apr. 8, 2015, the contents of which are incorporated by reference herein.

FIELD

The subject matter herein generally relates to grasping apparatuses.

BACKGROUND

Grasping apparatuses grasp an object and move the object. A grasping force of the grasping apparatus cannot be adjusted in response to different objects.

BRIEF DESCRIPTION OF THE FIGURES

Implementations of the present technology will now be described, by way of example only, with reference to the attached figures.

DETAILED DESCRIPTION

Figure 1:
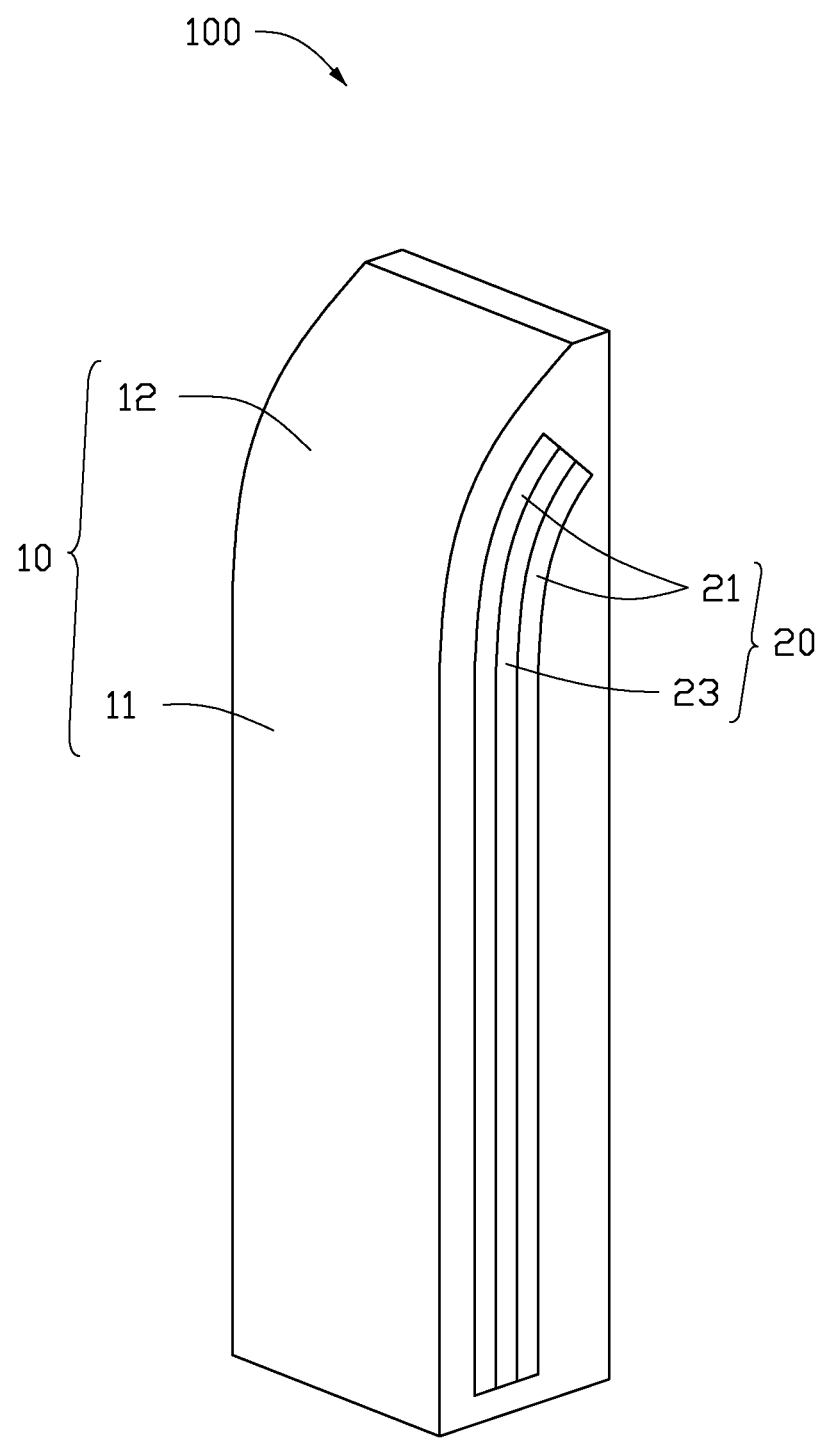
FIG. 1 is a diagrammatic view of an embodiment of a grasping apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a grasping apparatus 100 for adjusting a grasping force.

Figure 2:
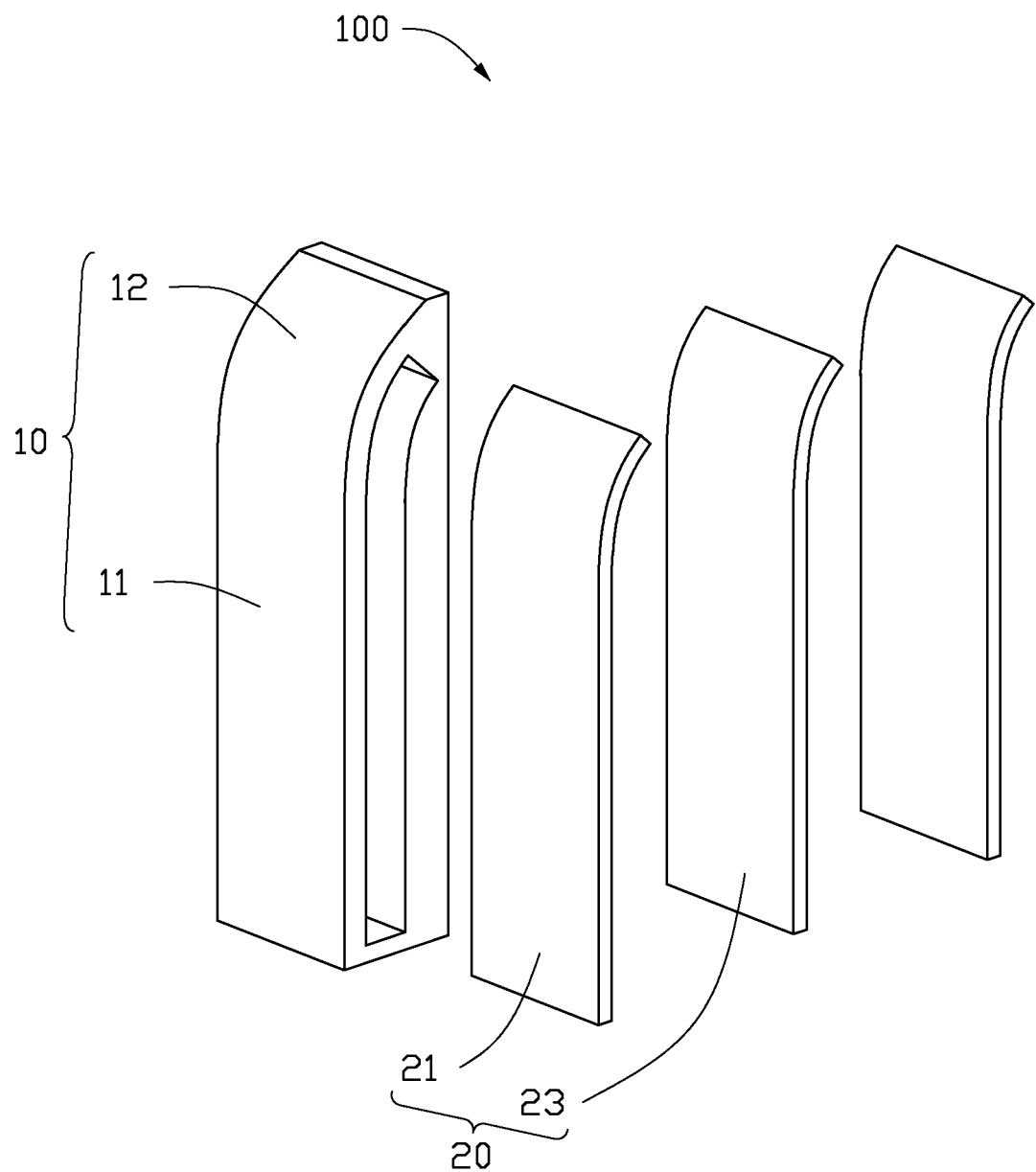
FIG. 2 is a partially exploded view of an embodiment of the grasping apparatus of FIG. 1, the display apparatus includes a pressure sensing mechanism.

FIGS. 1-2 illustrate an embodiment of a grasping apparatus 100 for grasping an object. In at least one embodiment, the grasping apparatus 100 is a partial of a mechanical arm. In other embodiments the grasping apparatus 100 can be a part of a robot.

The grasping apparatus 100 includes at least two grasping portions 10 and at least two pressure sensing mechanisms 20 corresponding to the grasping portions 10. The pressure mechanism 20 is located in the grasping portion 10. In at least one embodiment, the grasping portion 10 is a mechanical finger.

The grasping portion 10 includes a main body 11 and an end portion 12. The main body 11 is substantially rectangular shaped. The end portion is located on a top surface of the main body 11. Surfaces of the end portion 12 connected to the main body 11 is substantially arc shaped.

The pressure sensing mechanism 20 is received in the grasping portion 10. The pressure sensing mechanism 20 detects a grasping force between the grasping portions 10 while grasping the object connected to the grasping apparatus 100. The pressure sensing mechanism 20 includes two metal films 21 parallel with each other and an elastic portion 23 filled between the metal films 21.

The metal films 21 are spaced a predetermined distance from each other. The elastic portion 23 can be deformed. In at least one embodiment, the elastic portion 23 is made of conductive material.

Figure 3:
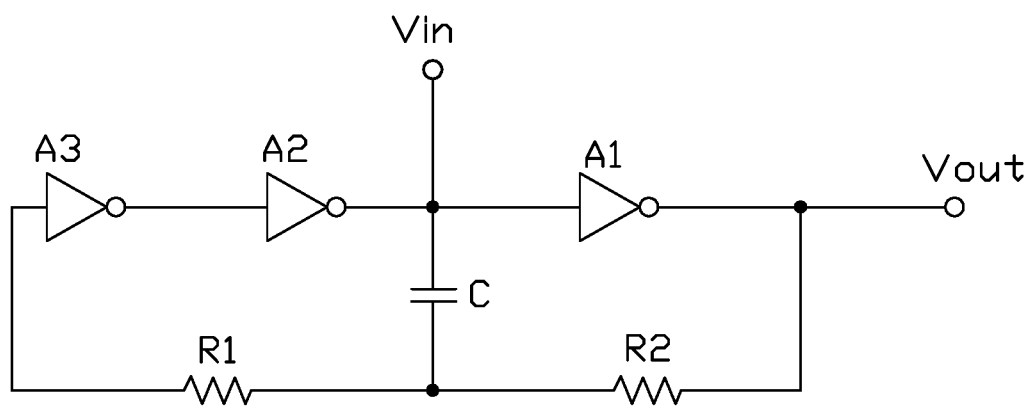
FIG. 3 is a circuit diagram of an embodiment of the pressure sensing mechanism of FIG. 2.

FIG. 3 illustrates a circuit diagram of the pressure sensing mechanism 20. The pressure sensing mechanism 20 detects the grasping force and converts the detected grasping force into a corresponding detection signal. The pressure sensing mechanism 20 further includes a power source Vin, an output terminal Vout, a first amplifier A1, a second amplifier A2, a third amplifier A3, a first resistor R1, a second resistor R2, and an equivalent capacitor C. An output terminal of the first amplifier A1 is electrically connected to the output terminal Vout, and an input terminal of the first amplifier A1 is electrically connected to the power source Vin. An output terminal of the second amplifier A2 is electrically connected to the power source Vin, and an input terminal of the first amplifier A1 is electrically connected to an output terminal of the third amplifier A3. An input terminal of the third amplifier A3 is electrically connected to a terminal of the first resistor R1. An opposite terminal of the first resistor R1 is electrically connected to the output terminal Vout via the second resistor R2. A terminal of the equivalent capacitor C is electrically connected to the power source Vin. An opposite terminal of the equivalent capacitor C is electrically connected between the first resistor R1 and the second resistor R2. In at least one embodiment, the equivalent capacitor C is a combination of the metal films 21 and the elastic portion 23.

When the grasping apparatus 100 contacts with the object, a grasping force is generated, causing the elastic portion 23 to be deformed and the distance between the metal films 21 to be decreased. A capacitance of the equivalent capacitor C changes, causing a detection signal output by the output terminal Vout to be changed.

The capacitance of the equivalent capacitor C is calculated via the following equation.

$$C = \epsilon 0 * \epsilon r * S/D$$

The $\epsilon 0$ represents the electric constant. The $\epsilon r$ represents the relative static permittivity. The S represent the area of overlap of the metal films 21. The represent the separation between the metal films 21.

Figure 4:
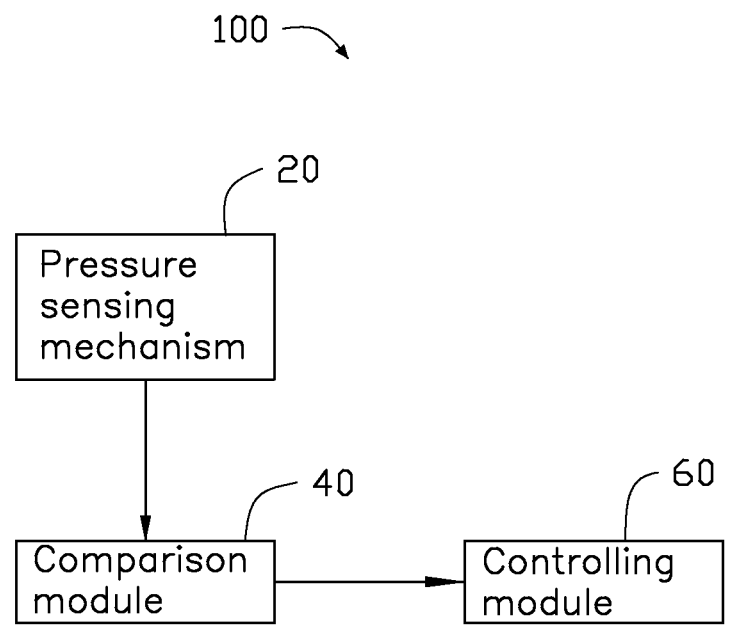
FIG. 4 is a block diagram of a first embodiment of the grasping apparatus of FIG. 1.

FIG. 4 illustrates a first embodiment of the grasping apparatus 100. The grasping apparatus 100 further includes a comparison module 40 and a controlling module 60. The pressure sensing mechanism 20 outputs the detection signal in response to the detected grasping force. The comparison module 40 is connected to the pressure sensing mechanism 20, and presets a predetermined value. The comparison module 40 compares the detection signal output by the pressure sensing mechanism 20 and the predetermined value. When the detection signal is larger than the predetermined value, the comparison module 40 generates a first control signal. When the detection signal is less than the predetermined value, the comparison module 40 generates a second control signal.

The controlling module 60 is connected with the comparison module 40 and the grasping portions 10. The controlling module 60 controls the grasping portions 10 to be apart from each other in response to the first control signal, which cause the distance between the metal films 21 to be increased. The controlling module 60 further controls the grasping portions 10 to be together in response to the second control signal, which cause the distance between the metal films 21 to be decreased.

Figure 5:
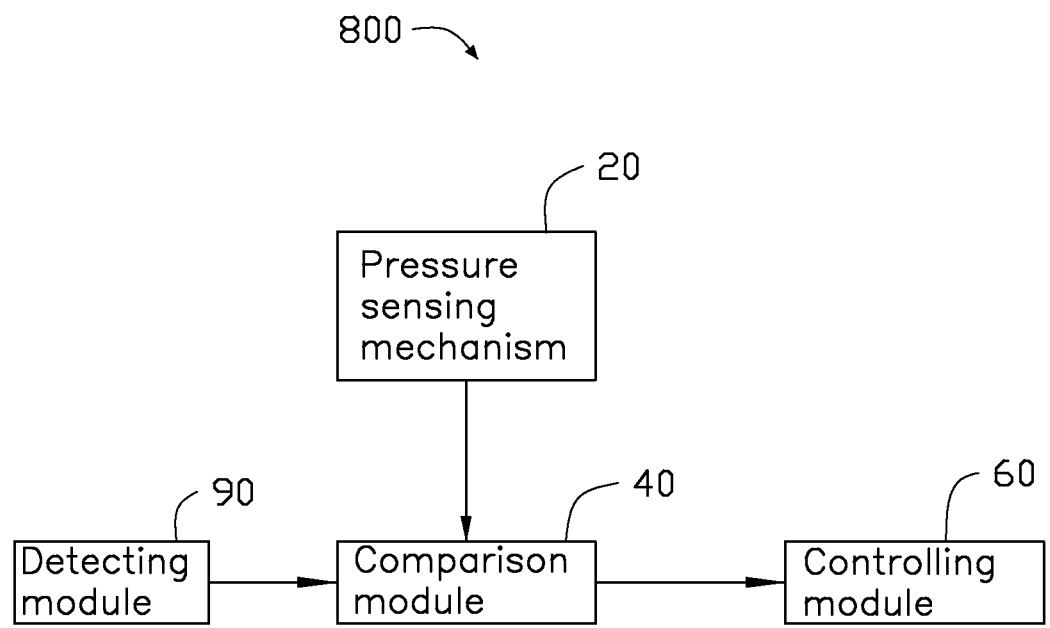
FIG. 5 is a block diagram of a second embodiment of the grasping apparatus of FIG. 1.

FIG. 5 illustrates a second embodiment of the grasping apparatus 800. The grasping apparatus 800 is capable of switching between different working states. The grasping apparatus 800 further includes a comparison module 40, a controlling module 60, and a detecting module 90.

The pressure sensing mechanism 20 outputs the detection signal in response to the grasping force.

The detecting module 90 is connected with the comparison module 40. The detecting module 90 detects a current working state of the grasping apparatus 800 and generates a corresponding state signal.

The comparison module 40 is connected with the pressure sensing mechanism 20 and detecting module 90, and presets a plurality of predetermined values. The comparison module 40 selects a predetermined value corresponding to the state signal generated by the detecting module 90. The comparison module 40 further compares the detection signal output by the pressure sensing mechanism 20 and the selected predetermined value. When the detection signal is larger than the predetermined value, the comparison module 40 generates a first control signal. When the detection signal is less than the predetermined value, the comparison module 40 generates a second control signal.

The control module 60 is connected with the comparison module 40 and the grasping portions 10. The control module 60 controls the grasping portions 10 to be apart from each other to respond to the first control signal, which cause the distance between the metal films 21 to be increased. The control module 60 further controls the grasping portions 10 to be in response to the second control signal, which cause the distance between the metal films 21 to be decreased. In other embodiments, the control module 60 controls the plurality of the grasping portions to be apart or together in response to different control signals.

In use, the grasping apparatus 100 can sense the grasping force between the grasping apparatus 100 and the object via the pressure sensing mechanism 20, and adjusts the grasping force in response to the sensed result. Thus, the sensitivity of the grasping apparatus 100 is improved.

While various embodiments have been described, the disclosure is not to be limited thereto. Various modifications and similar arrangements (as would be apparent to those skilled in the art) are also intended to fall within this disclosure. The scope of the appended claims should be construed to encompass all such modifications and similar arrangements.

What is claimed is:

1. A grasping apparatus for grasping an object; the grasping apparatus comprising:
   at least two grasping portions configured to grasp the object; and
   at least two pressure sensing mechanisms disposed in the corresponding grasping portions, the pressure sensing mechanisms configured to detect a grasping force between the grasping portions when the object is grasped;
   wherein each of the at least two the pressure sensing mechanisms comprises two parallel metal films and an elastic portion therebetween;
   wherein the elastic portion is configured to deform to decrease the distance between the metal films, thereby enabling adjustment of the grasping force based on the detected grasping force; and
   wherein the pressure sensing mechanism further includes a power source, an output terminal, a first amplifier, a second amplifier, a third amplifier, a first resistor, a second resistor, and an equivalent capacitor; an output terminal of the first amplifier is electrically connected to the output terminal, and an input terminal of the first amplifier is electrically connected to the power source; an output terminal of the second amplifier is electrically connected to the power source, and an input terminal of the first amplifier is electrically connected to an output terminal of the third amplifier; an input terminal of the third amplifier is electrically connected to a first terminal of the first resistor; a second terminal of the first resistor is electrically connected to the output terminal via the second resistor; a first terminal of the equivalent capacitor is electrically connected to the power source, and a second terminal of the equivalent capacitor is electrically connected between the first resistor and the second resistor.

2. The grasping apparatus of claim 1, wherein the grasping apparatus further comprises a comparison module and a control module; the pressure sensing mechanism generates a corresponding detection signal; the comparison module compares the detection signal and a predetermined value, and generates a control signal based on the comparison result; the controlling module adjusts the distance between the grasping portion.

3. The grasping apparatus of claim 2, wherein when the detection signal is larger than the predetermined value, the comparison module generates a first control signal; the controlling module controls the grasping portions to be apart from each other in response to the first control signal.

4. The grasping apparatus of claim 2, wherein when the detection signal is less than the predetermined value, the comparison module generates a second control signal; the controlling module controls the grasping portions to be together in response to the second control signal.

5. The grasping apparatus of claim 1, wherein the equivalent capacitor is a combination of the metal films and the elastic portion.

6. The grasping apparatus of claim 1, wherein the grasping apparatus is capable of switching between different working states; the grasping apparatus further comprises a detecting module, a comparison module, and a controlling module; the detecting module detects a current working state of the grasping apparatus, and generates a corresponding state signal; the comparison module presets a plurality of predetermined values; the comparison module selects a predetermined value corresponding to the state signal generated by the detecting module; the comparison module compares the detection signal and the selected predetermined value, and generates a control signal based on the comparison result; the controlling module adjusts the distance between the grasping portion.

7. The grasping apparatus of claim 6, wherein when the detection signal is larger than the selected predetermined value, the comparison module generates a first control signal; the controlling module controls the grasping portions to be apart from each other in response to the first control signal.

8. The grasping apparatus of claim 7, wherein when the detection signal is less than the selected predetermined value, the comparison module generates a second control signal; the controlling module controls the grasping portions to be together in response to the second control signal.

9. A grasping apparatus for grasping an object; the grasping apparatus comprising:
- at least two grasping portions configured to grasp the object;
- at least two pressure sensing mechanisms disposed in the corresponding grasping portions, the pressure sensing mechanism configured to detect a grasping force between the grasping portions while grasping the object and generate a detection signal based on the detected grasping force;
- a comparison module connected to the pressure sensing mechanism, and configured to generate a corresponding control signal via comparing the detection signal and a predetermined value; and
- a controlling module connected to the comparison module and the pressure sensing mechanism, and configure to adjust a grasping force between the grasping portions and the object in response to the control signal generated by the comparison module;
- wherein each of the at least two pressure sensing mechanisms comprises two metal films parallel with each other and an elastic portion filled between the metal films; when the elastic portion deforms to decrease the distance between the metal films for sensing the grasping force.

10. The grasping apparatus of claim 9, wherein when the detection signal is larger than the predetermined value, the comparison module generates a first control signal; the controlling module controls the grasping portions to be apart from each other in response to the first control signal.

11. The grasping apparatus of claim 9, wherein when the detection signal is less than the predetermined value, the comparison module generates a second control signal; the controlling module controls the grasping portions to be together in response to the second control signal.

12. The grasping apparatus of claim 9, wherein pressure sensing mechanism further includes a power source, an output terminal, a first amplifier, a second amplifier, a third amplifier, a first resistor, a second resistor, and an equivalent capacitor; an output terminal of the first amplifier is electrically connected to the output terminal, and an input terminal of the first amplifier is electrically connected to the power source; an output terminal of the second amplifier is electrically connected to the power source, and an input terminal of the first amplifier is electrically connected to an output terminal of the third amplifier; an input terminal of the third amplifier is electrically connected to a first terminal of the first resistor, a second terminal of the first resistor is electrically connected to the output terminal via the second resistor; a first terminal of the equivalent capacitor is electrically connected to the power source, and a second terminal of the equivalent capacitor is electrically connected between the first resistor and the second resistor.

13. The grasping apparatus of claim 12, wherein the equivalent capacitor is a combination of the metal films and the elastic portion.

* * * * *